United States Patent [19]

Burkhead

[11] 4,422,139

[45] Dec. 20, 1983

[54] TRANSFORMER COUPLED UP-DOWN CONVERTER

[75] Inventor: Lowell E. Burkhead, Springville, Iowa

[73] Assignee: Rockwell International Corporation, El Segundo, Calif.

[21] Appl. No.: 362,730

[22] Filed: Mar. 29, 1982

[51] Int. Cl.³ .............................................. H02P 13/22
[52] U.S. Cl. ........................................ 363/21; 363/97; 363/131
[58] Field of Search ................... 363/20, 21, 26, 97, 363/131

[56] References Cited

U.S. PATENT DOCUMENTS

| 4,025,863 | 5/1977 | Higuchi | 363/97 |
| 4,122,514 | 10/1978 | Amin | 363/21 |

FOREIGN PATENT DOCUMENTS

| 55-68880 | 5/1980 | Japan | 363/21 |
| 570734 | 12/1975 | Switzerland | 363/131 |
| 614430 | 7/1978 | U.S.S.R. | 363/97 |

OTHER PUBLICATIONS

Intersil, Application Bulletin A035, "Switchmode Converter Topologies–Make Them Work for You", by Rudy Severns, ©1980, pp. 1/32 and 18/32 only.
IEEE Trans. on Consumer Electronics, vol. CE-26, pp. 142–148, Feb. 1980.

Primary Examiner—William H. Beha, Jr.
Attorney, Agent, or Firm—George A. Montanye; Howard R. Greenberg; H. Fredrick Hamann

[57] ABSTRACT

A transformer coupled DC-to-DC converter provides a regulated output with only one active switch. The converter includes a switch, a diode and an inductor coupled to the primary of a transformer in a way which provides symmetry to the transformer as the duty cycle of the switch changes for regulation. The circuit may be current-fed by supplying an input voltage higher than the transformer ratio would indicate, or may be voltage-fed by providing an input voltage lower than the transformer ratio would indicate. The circuit is operated to charge an inductor through the switch and half the primary of a transformer and discharge the inductor through the other half of the primary so that equal energy is provided through the transformer during charging and discharging, thereby providing a symmetrical signal without the need for more than one switch.

12 Claims, 4 Drawing Figures

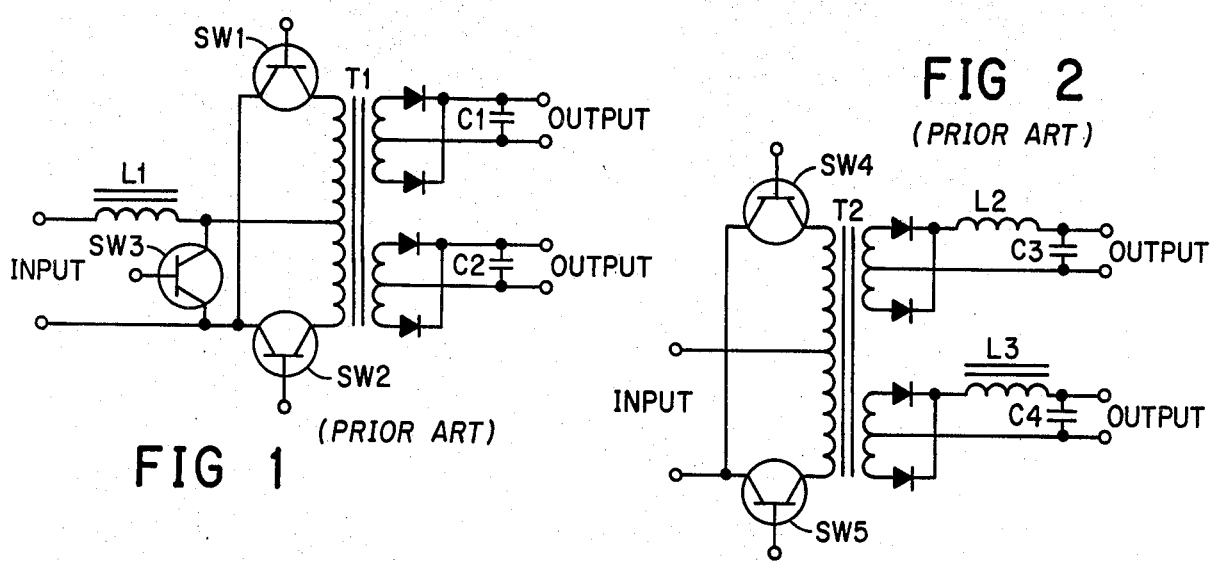
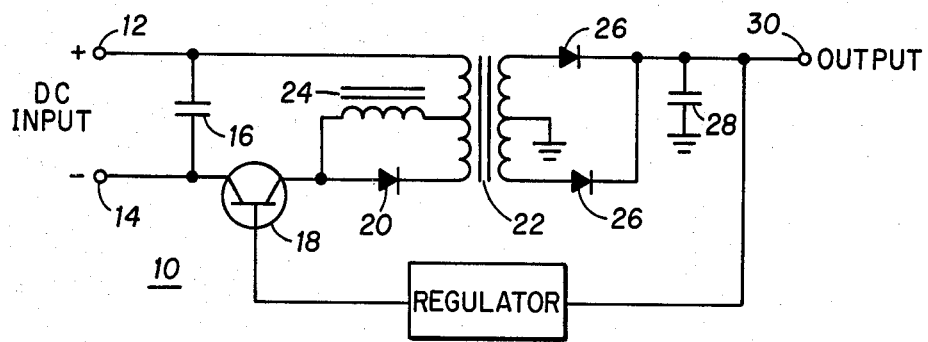
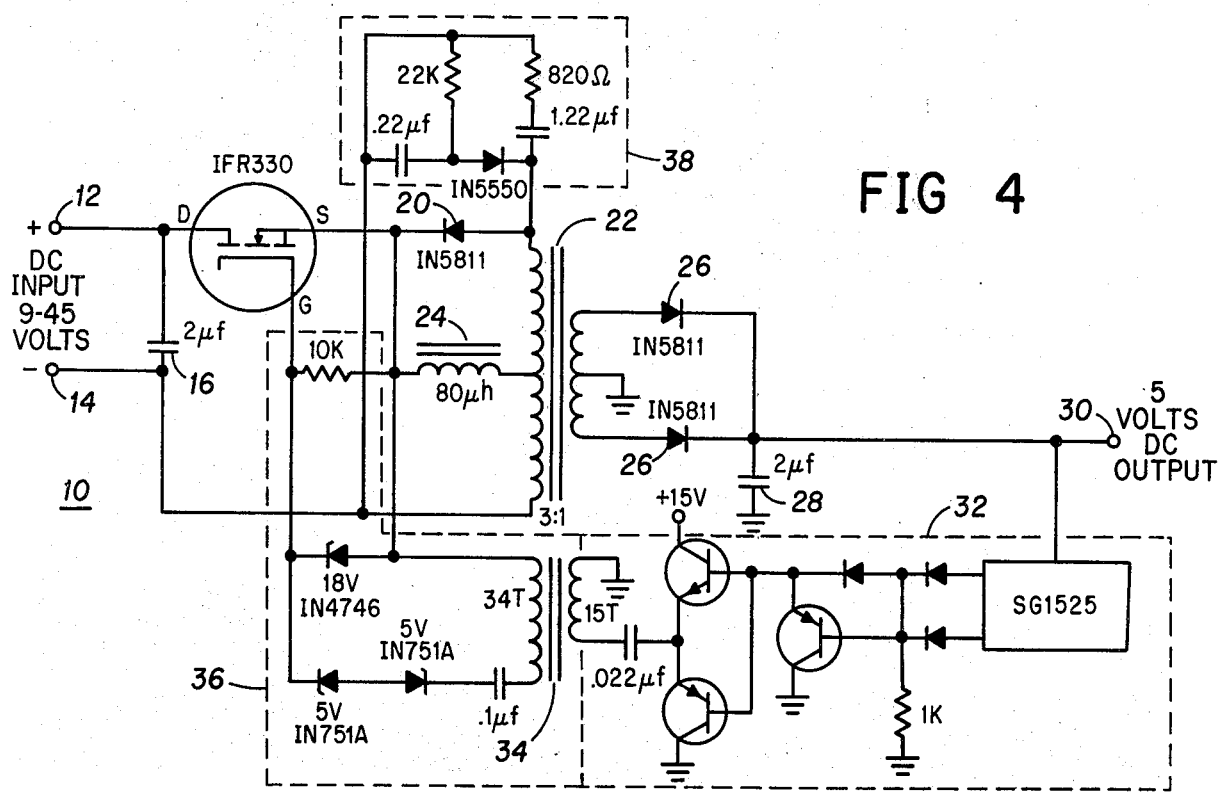

TRANSFORMER COUPLED UP-DOWN CONVERTER

BACKGROUND OF THE INVENTION

The present invention relates to regulated power sources and more particularly to a DC-to-DC converter for providing simpler and less costly isolated power source regulation.

A variety of converter circuits are known in the prior art which are capable of providing DC voltage and current regulation. Typically, the converters have a variety of configurations including the push-pull type, the up-converter and the down-converter. While each of the known devices provide inherent benefits, one of the biggest disadvantages is the complexity of the structures and the regulation and control needed to operate the circuits.

In typical converter circuits, at least two active switches are required in the input circuit to provide switching and maintain symmetry at the transformer. The circuits may be operated in the current-fed or voltage-fed mode, but, in any event, often require specific and detailed regulating circuits to control the output signals. As would be expected, the use of two active switches, in addition to creating a more complex structure, results in a device which may still have non-symmetrical characteristics because of differences in the two switches. As a result, various filtering and switching techniques must be employed to provide proper operation and produce wave-forms of an acceptable shape and magnitude.

In most cases, prior art push-pull and up- or down-converters suffer from several additional disadvantages. In the push-pull converters, there is usually dead time regulation when current or voltage is not being supplied to the output circuit. For low and high line regulation in such structures, larger output filters, high current diodes and high current transformers are required for sustained operation. Likewise, during low line conditions, peak clippers may be required to limit the high energy pulses which occur when the transformer comes out of saturation. Examples of a typical push-pull converter configuration and a description of its operation can be found by reference to U.S. Pat. No. 3,938,024.

In up-converters the maximum efficiency is usually attained only at high line voltage inputs. Additionally, up-converters normally provide a discontinuous output current and require more elements to provide the regulation. Down-converters on the other hand, generally provide a continuous output current over the entire regulation range but, again, maximum efficiency is only obtained at low line input. In down-converters, multiple outputs are not well coupled, there is no inherent current limiting by the circuits and more parts are required, thereby rendering the circuit more complex.

In current technology systems, there is an increasing demand for more inexpensive and well-regulated power supplies capable of providing output isolation and regulation for multiple taps from a single input supply source. In avionics systems in particular, it is important that well-regulated voltage and current outputs are provided over wide ranges of input voltage variations and transients. The regulation is particularly required to avoid damage to extremely sensitive electronic components and circuits and to lessen the cost and space requirements of the power supplies needed to drive increasingly complex circuits.

Accordingly, the present invention has been developed to overcome the shortcomings of the above known and similar techniques and to provide a more effective, efficient and less complex power supply for use in a variety of electronic systems.

SUMMARY OF THE INVENTION

In accordance with the invention, a pulse width regulated DC-to-DC converter is disclosed which utilizes only one active switch to provide continuous load current to an output isolated through a transformer. A DC voltage, which may vary over a predetermined range, is coupled through an active switch and an inductor to half the input primary of a transformer. The inductor is connected through a diode back to the other half of the transformer primary winding. The output is taken from the transformer secondary and must be full wave rectified. The switch is operated between conduction and non-conduction by a pulse width modulated signal. During conduction, the DC input voltage charges the inductor through one half of the transformer primary. During non-conduction, the inductor discharges through the diode and through the other half of the transformer primary. In this manner, the charge and discharge of energy by the inductor is always the same and a symmetrical signal is provided to the transformer which prevents the transformer core from saturating without the need for more than one active switch. The switch may be controlled by a conventional pulse width regulator circuit to easily compensate for changes of the input voltage over a wider range of input voltages and provide a regulated output which is substantially independent of load current. The pulse width modulator would provide a symmetrical square wave in the center of the regulation range and vary in either direction to maintain regulation from about 10% to 90% duty cylces.

It is therefore a feature of the invention to provide a power supply circuit which enables inexpensive and less complex isolated DC-to-DC conversion.

Another feature of the invention is to provide an isolated regulated converter which provides the desired regulation with double the input voltage variation capability of previous transformer coupled power conversion systems.

Still another feature of the invention is to provide a power regulating circuit which provides current output with no dead time and a voltage which is substantially independent of output current at the center of the regulation range.

Yet another feature of the invention is to provide a regulated power supply circuit which can provide high current outputs with minimal output filtering at the center of the regulation range.

A further feature of the invention is to provide a regulated power supply circuit which has more flexibility in configuration for more versatile application.

Yet a further feature of the invention is to provide a regulated power supply circuit having a wide regulation range and which is insensitive to load changes but still has inherent current limiting due to the series inductor.

Still a further feature of the invention is to provide a regulated power supply circuit which operates most efficiently in the center of its regulation range.

These and other advantages and novel features of the invention will become apparent from the following detailed description when considered with the accompanying drawings wherein:

BRIEF DESCRIPTION OF THE DRAWINGS

FIG. 1 is a schematic diagram showing a typical up-converter of the prior art.

FIG. 2 is a schematic diagram showing a typical down-converter of the prior art.

FIG. 3 is a schematic diagram showing the DC-to-DC converter of the present invention.

FIG. 4 is a schematic diagram showing a more detailed embodiment of the circuit of FIG. 3.

DETAILED DESCRIPTION OF A PREFERRED EMBODIMENT

Referring first to FIG. 1, there is shown a diagram of an up-converter that is known in the prior art. Basically, the converter includes input terminals which receive a DC input voltage. The DC input voltage is provided through inductor L1 to a center tap of the primary of the transformer T1. Switches SW1 and SW2 are connected to opposite ends of the transformer primary and to one of the DC input terminals. Switch SW3 is connected between the center tap and the same input terminal as switches SW1 and SW2. Switches SW1, SW2, and SW3 may be controlled by conventional regulating circuits to vary the current through the illustrated portions of transformer T1. The output of the converter is taken from secondary taps on the transformer T1 to provide multiple outputs. The multiple outputs, as shown, include center tapped portions with diode rectifiers providing a full-wave rectified output across capacitors C1 and C2.

In the above configuration, one of the advantages of the circuit is that it provides a continuous input current which produces less switching noise on the input line than other similar circuits. This configuration, however, requires multiple switches to produce a regulated output and operates in such a manner that there is a discontinuous current output from the secondary. Typically, each of the switches SW1 and SW2 are operated at a 50% duty cycle while switch SW3 is pulse width modulated. The maximum efficiency of the circuit occurs for a high line input voltage and in this configuration, the circuit only operates effectively over half of the regulation range of the supply.

Referring next to FIG. 2, there is shown a typical down-converter which again employs multiple active switches in the input circuit. In this example, DC input is provided through switches SW4 and SW5 to the primary of a transformer T2. Switches SW4 and SW5 are also pulse width modulated to control current to the outputs of the secondary windings. The secondary includes multiple secondary taps each of which include diode rectifiers coupled to produce a full-wave rectified signal for each of the plural secondary outputs. Each output is coupled through a filter circuit including inductor L2 and capacitor C3 in one output, and inductor L3 and capacitor C4 in the other output.

One of the advantages of the down-converter is that it provides a continuous output current from the multiple secondary outputs over the entire regulation range of the converter. However, this circuit configuration again requires multiple active switches in the input circuit and a substantial number of elements in the output circuits. Additionally, there is no inherent current limiting by the circuit, the maximum efficiency of the circuit is at one end of the range and the output circuits from the secondary are not well coupled.

Turning now to FIG. 3, there is shown a schematic diagram of the DC-to-DC regulated power supply/converter 10 of the present invention. The present circuit 10 includes input terminals 12 and 14 which receive a DC input voltage which may, for example, vary over a range of 9 to 45 volts. A capacitor 16 is coupled in parallel with the input terminals 12 and 14 and serves to decouple the switching current from the DC input lines. A switch 18 has one terminal coupled to one of the input terminals (14) and a second terminal coupled to the anode of diode 20. The diode 20 has its cathode coupled to one side of the primary winding of transformer 22. The other side of the primary winding of the transformer 22 is in turn coupled to the other input terminal (12). A center tap of the transformer 22 is coupled to inductor 24 which has its other terminal electrically coupled to a common point between switch 18 and diode 20.

The output of the converter is taken from the secondary of the transformer 22. In the present example, only one output circuit is shown. It will be understood, however, that multiple output circuits of similar construction may be employed, if needed. In the circuit output of FIG. 3, each terminal of the secondary is coupled to an anode of one of the diodes 26. The cathodes of diodes 26 are electrically coupled in common and to one terminal of a capacitor 28. The other terminal of capacitor 28, as well as the center tap of the transformer secondary, is coupled to ground. The output of circuit 10 is provided at terminal 30 across the capacitor 28.

The circuit is controlled by a regulator 32 which is coupled to sense the output voltage at terminal 30. The regulator 32 provides a control signal to the control terminal of switch 18 to control the conductive periods of switch 18 for maintaining a constant DC output voltage for variations in the DC input voltage. As will be understood, the regulator 32 may be any of a wide variety of conventional circuits designed to provide power supply output regulation. By way of example, the regulator 32 could be a pulse width modulated regulator made by Silicon General and identified as an SG1525. The switch 18 may also be any of a wide variety of power switching devices, but in the present instance is a power MOS/FET.

The above circuit is operated as both a voltage-and current-fed converter according to the input voltage, and provides transformer isolation using only one active switch. As is understood by reference to FIG. 3, the DC voltage input is provided across the capacitor 16 to charge the capacitor and thereafter provide a voltage across the primary of transformer 22. During the positive portion of a pulse from regulator 32 driving the control terminal of switch 18, current from the DC input charges the inductor 24 through the center tap and one half of the transformer primary and induces a current in the secondary which is rectified by the diode rectifiers 26. The rectified voltage is then coupled to capacitor 28 as the output signal from terminal 30. During the negative portion of the pulse, the switch 18 is rendered non-conductive and the inductor 24 discharges through the diode 20 and the other half of the primary of transformer 22 thereby inducing an output current which is again rectified by the diodes 26 and provided as an output across capacitor 28. Since the inductor 24 charge and discharge is always the same, the same amount of energy is provided to the transformer primary from each of the above-mentioned half cycles, and the transformer sees a symmetrical signal. The output is thus provided with a continuous output current and without the need for multiple active switches in the input circuit.

When the input voltage is that value required across the whole primary to provide the desired regulated output across half the secondary, the circuit is operated as a current-fed inverter. At this time, the output 30 is coupled through the regulator 32 to control switch 18. In response to the output at 30, the regulator 32 provides a square wave to the control terminal of switch 18 so that current is provided continuously to capacitor 28, and any load, at the desired regulated voltage. As was noted previously, this is the most efficient point of circuit operation and, unlike other converter circuits, is the center of the regulation range rather than at one end of that range. The circuit therefore provides a regulation range of approximately twice that normally found in up- or down-converters. When used as a power supply, the circuit can be set to run at its most efficient point with normal input line voltage while still providing high and low line voltage regulation.

In one example of the construction and operation of the present invention, the particular elements set forth in the schematic of FIG. 4 were used to construct and test the converter/supply circuit of FIG. 3. In FIG. 4, each of the elements were coupled in the manner shown with their values fixed as designated in the drawing. In this instance, the input voltage was delivered in a range between 9 and 45 volts. The output voltage was specified to be 5 volts for a nominal input voltage of 35 volts. In this configuration, the transformer ratio was fixed at a value of 3:1 which allowed for a 6 volt AC peak on the transformer secondary with a 1 volt diode drop to provide a 5 volt output. The transformer was wound so that there were 60 turns CT primary and 20 turns CT secondary. The regulator 32 is a Silicon General SG1525 pulse width modulator circuit having its outputs connected in a conventional manner to provide for the variation on the duty cycle from zero to about 90%. The output from the regulator 32 is coupled to a transformer 34 having the winding ratios shown and coupled to drive the switch 18 in the input to the primary circuit of transformer 22. In this instance, the circuit 36 was developed to provide AC drive and DC bias to the switch 18 but to keep the transformer 34 at zero after the delivery of the voltage spike to the control element of switch 18. Other conventional circuits 16 could likewise be used to couple the regulating pulse width modulated control signal to the switch 18 to perform the regulating function. In this example, the circuit 38 is a conventional peak clipper which prevents the power MOS/FETswitch 18 from being destroyed by high transient voltages.

With a 35 volt DC input and the control chip running a square wave regulating voltage of about 200 kHz, the output of circuit 10 is supplied fulltime in a manner similar to a conventional fly-back down-converter. In addition to operating in approximately the center of its regulation range under these circumstances, the circuit 10 also has no dead time and is very insensitive to load changes. Current is supplied continuously to the output and high current output can be achieved with minimal output filtering. In contrast to conventional push-pull circuits where this type of regulation can only be achieved at one end of the regulation range, the present circuit operates most efficiently in the center of the regulation range. Input regulation using the SG1525 chip was achieved over the 9 to 45 volt DC range with output regulation maintained from no load to 5 amps at the 5 volt output. It will be understood that the 35 VDC nominal input voltage (and the output voltage) could be changed to any desired voltage by changing the transformer 22 winding ratio. The current capability of the output circuit could be increased by choosing a more powerful switch 18, diode 20, output rectifiers 26 and transformer 22.

In contrast to prior art circuits, the present circuit would require a larger output filter and higher current diodes if it were to be operated consistently for low and high line regulation. Also, low line operation requires the peak clipper 38 to catch high energy pulses from inductor 24 when transformer 22 is coming out of saturation. However, for transient high and low line voltage conditions with normal operation in the central region of the regulation range, the present circuit provides an isolated output with high current capability and no dead time, all with only one active switch in the input circuit. This configuration requires less components, provides an inexpensive design and produces greater configuration flexibility for specific applications. By having circuit operation in the center of the regulation range, the regulation range is wider than that normally encountered in conventional up or down converters. In addition, the present circuit provides a well-regulated output voltage which is insensitive to load changes. These are all advantages and features that are not shown or taught by the prior art.

While the invention has been described with particular reference to elements and component values, it is apparent that other elements and various values could be used in line with the above description. Obviously, many other variations and modifications are possible in light of the above teachings. It is therefore to be understood that within the scope of the appended claims the invention may be practiced otherwise than as specifically described.

What is claimed is:

1. A power converting apparatus comprising:
  input means for receiving DC power;
  transformer means coupled to receive power from said input means and provide an output; and
  conduction means coupled to said transformer means and said input means for conducting current from said input means and causing a charging current to flow from said input means through a first portion of said transformer means during a first time period to provide said output and for blocking current flow from said input means and causing a discharging current to flow through a second portion of said transformer means during a second time period to provide said output, said conduction means including:
    switch means having a first conducting state and a second non-conducting state coupled to said input means for providing said charging current flow when said switch means is in said first conducting state and for blocking said current flow when said switch means is in said second non-conducting state;
    inductor means coupled to receive current flow from said switch means and provide said charging current through said first portion of the transformer means during said first time period; and rectifier means coupled for conducting said discharge current flow from said inductor means through said second portion of said transformer means during said second time period.

2. The apparatus of claim 1 further including control means coupled to said conduction means for controlling said conduction means to alternate said first and second time periods to cause equal current flow during each of said time periods.

3. The apparatus of claim 2 wherein said control means includes means responsive to the output of said transformer means for controlling said conduction means so that said alternate periods produce a regulated voltage at the output of said transformer means.

4. The apparatus of claim 1 further including means coupled to the output of said transformer means for providing a full wave rectified output.

5. The apparatus of claim 1 further including a capacitor coupled to said input means for storing and decoupling the input power and a capacitor coupled to the output of said transformer means for filtering said output.

6. A DC-to-DC converter comprising:
first and second input terminals for receiving power from a DC source;
a switch having first and second terminals controlled by a third terminal to conduct current between said first and second terminals during a first switch state and to interrupt current flow between said first and second terminals during a second switch state, said first switch terminal being coupled to said first input terminal;
a transformer having primary and secondary windings each including first and second end terminals and a center tap terminal;
a rectifier having first and second terminals, said first rectifier terminal being coupled to the first end terminal of said transformer primary and said second rectifier terminal being coupled to said second switch terminal; and
an inductor having first and second terminals, said first inductor terminal being coupled to said transformer primary center tap and said second inductor terminal being coupled to said second switch terminal, said second transformer end terminal being coupled to said second input terminal;
said rectifier being oriented to block current flow through said rectifier during said first switch state to cause a charging current flow through said inductor and a first portion of said transformer primary, and to conduct current from said inductor through a second portion of said transformer primary windings during said second switch state.

7. The apparatus of claim 6 further including rectifier means coupled to said secondary end terminals to provide a full wave rectified output.

8. The apparatus of claim 6 further including means coupled to the control terminal of said switch and responsive to output from said secondary end terminals for alternately causing said switch to change from said first switch state to said second switch state.

9. A DC power supply comprising:
a source of DC power having first and second terminals;
a switch means having first and second terminals and a control terminal for controlling said switch to be alternately conducting and non-conducting to current flow between said first and second terminals, said first switch terminal being coupled to said first DC power terminal;
a transformer means having a primary including first and second end terminals and a center tap terminal and a secondary for providing an output;
a rectifier having first and second terminals, said first rectifier terminal being coupled to said first end terminal and said second rectifier terminal being coupled to said second switch terminal, said second end terminal being coupled to said second DC power terminal; and
an inductor having first and second terminals, said first inductor terminal being coupled to said center tap terminal and said second inductor terminal being coupled to said second switch terminal;
said rectifier being oriented to cause charging current flow from said DC source through said inductor and a portion of the primary of said transformer means during conducting periods of said switch means and causing discharging current flow from said inductor through said rectifier and another portion of the primary of said transformer means during non-conducting periods of said switch means.

10. The apparatus of claim 9 further including means responsive to the output of the secondary of said transformer means and coupled to the control terminal of said switch means for alternately controlling the conducting and nonconducting periods of said switch means to provide a regulated voltage output.

11. The apparatus of claim 9 further including rectifier means coupled to the secondary output for providing a full wave rectified output.

12. A method of providing a regulated output voltage comprising:
providing a variable source of DC input power;
conducting current from said DC source through a switch to cause a charging current flow through an inductor and a first portion of a transformer means during a first time period;
blocking current flow from said DC source through said switch during a second time period to cause a discharge current flow from said inductor through another portion of said transformer means during a second time period;
providing an output from said transformer means during said first and second time periods; and
controlling said switch to conduct and block current flow for variable duty cycles of charging and discharging current flow so that the output of said transformer means is regulated.

* * * * *